United States Patent [19]

Travnicek

[11] 4,141,941
[45] Feb. 27, 1979

[54] CONTACT LENS CASTING METHOD

[75] Inventor: Edward A. Travnicek, Southbridge, Mass.

[73] Assignee: American Optical Corporation, Southbridge, Mass.

[21] Appl. No.: 835,114

[22] Filed: Sep. 21, 1977

[51] Int. Cl.$^2$ ............................................. B29D 11/00
[52] U.S. Cl. ..................... 264/1; 264/342 R; 264/344
[58] Field of Search ............... 264/1, 232, 342 R, 344

[56] References Cited

U.S. PATENT DOCUMENTS

| 2,976,576 | 3/1961 | Wichterle et al. | 351/160 |
|---|---|---|---|
| 3,220,960 | 11/1965 | Wichterle et al. | 351/160 |
| 3,350,216 | 10/1967 | McVannel et al. | 264/1 |
| 3,819,782 | 6/1974 | Irie | 264/1 |
| 4,042,652 | 8/1977 | Feneberg | 264/1 |

Primary Examiner—James B. Lowe
Attorney, Agent, or Firm—Jeremiah J. Duggan; H. R. Berkenstock, Jr.

[57] ABSTRACT

Producing from a single contact lens casting mold, lenses of a number of different sizes by including in the casting precursor for each lens, a controlled amount of an extractable diluent of low volatility which is extracted after casting to cause the resulting lens to shrink a calculable amount. Variations in amounts are used to produce corresponding variations in sizes of cast and extracted lenses.

12 Claims, 1 Drawing Figure

CONTACT LENS CASTING METHOD

BACKGROUND OF THE INVENTION

1. Field of the Invention

The present invention relates to the manufacture of cast contact lenses with particular reference to controlling lens sizes independently of mold size.

2. Description of the Prior Art

Contact lenses are being made of "soft" materials, e.g. silicone resins, by casting them in split molds. U.S. Pat. Nos. 3,761,208 and 3,915,609 are exemplary. The molds are provided with casting surfaces having the curved shapes, diameters and high optical polish needed to produce the desired optical and physical parameters. Heretofore, each different lens prescription has required a different pair of costly and difficult to make mold halves rendering cast contact lens production less than optimally efficient, tedious and overly expensive.

With a view to overcoming the aforesaid and corollary drawbacks of current contact lens casting operations, it is an object of the present invention to provide for the casting of a multiplicity of lens sizes from a single pair of casting mold halves by adding an extractable diluent to the casting precursor and extracting the diluent after casting. By judicious use of the diluent, finished cast lens sizes smaller than casting cavity size can be reliably regulated.

While the prior art, e.g. U.S. Pat. No. 3,496,254, suggests that rigid contact lenses can be soaked in swelling agents for increasing their size and rendering them flexible, the ultimate size of such lenses can only be regulated by control of the casting cavity size, i.e. a different casting cavity for each change in finished lens size, and the aforementioned problems of prior art lens casting inefficiencies, tediousnesses and high cost remain. Control of lens size according to the present invention with a precursor diluent and its ultimate extraction instead of mold size changes, avoids these problems and drawbacks.

Other advantages of the invention will become apparent from the following description.

SUMMARY OF THE INVENTION

The invention contemplates the inclusion of an extractable diluent of predetermined amount into a contact lens casting resin mixture prior to casting. The diluent is extracted with a solvent after the lens is cast and the solvent is evaporated causing the lens to shrink a calculable amount, i.e. an amount determined by the amount of diluent initially used.

The diluent must be miscible with the casting resin and not reactive with any of its components. It is preferably of low volatility so that the casting resin mixture will remain stable, i.e. at a fixed composition, during preparation and casting.

By further selection of an extraction solvent easily evaporated from the cast and extracted lens, efficient and predictable lens shrinkage can be accomplished to control finished lens size according to casting cavity size by a measure of the "stuffing" diluent, i.e. the diluent added to the casting resin.

Details of the invention will become more readily apparent from the following description when taken in conjunction with the accompanying drawing in which:

FIG. 1 is an illustration in cross-section of a contact lens casting mold and lens which is exemplary of the type of system to which the method of the present invention is particularly applicable, but not necessarily restricted.

DESCRIPTION OF THE PREFERRED EMBODIMENTS

Figure 1:
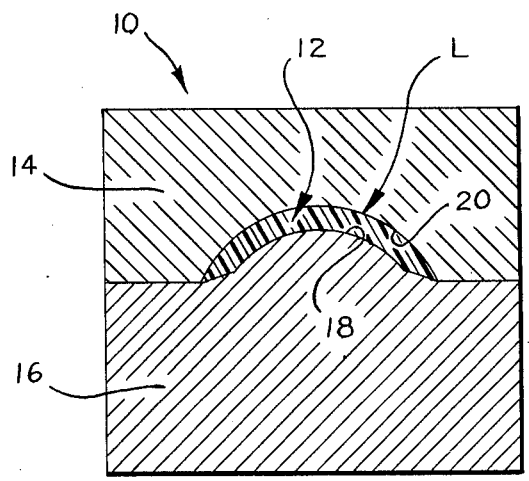

Silicone contact lenses are traditionally cast in split molds, e.g. as illustrated in FIG. 1. These molds have the curvatures, diameters and high optical polish necessary to cast a lens with desired optical and physical parameters. Three variables are crucial to the successful fitting of silicone lenses to any given patient. These are refractive powers of the lens, base curve radius of the lens and the overall diameter of the lens. The latter two variables are interrelated in that they both affect the saggital depth of the lens but are considered independent when designing and constructing molds for the lenses.

The number of different lenses is large if one wants to fit all sizes. If, for example, one chooses to fit optical powers from only 0.0 (plano) to −9.5 diopters inclusive in increments of 0.25 diopters, there are thirty-nine different powers. Similarly it can be expected that at least nine base curve radii will be needed, i.e. 7.50 mm to 8.30 mm in steps of 0.10 mm and possibly twenty-one steps or sizes from 7.40 mm to 8.4 mm inclusive in steps of 0.05 mm.

It can also be expected that at least three lens diameters will be needed, e.g. 11.5, 12.0 and 12.5 mm and possibly as many as seven diameters, e.g. 11.5 mm to 13.0 mm in increments of 0.25 mm.

Accordingly, for the more limited case of thirty-nine powers, nine base curve radii and three diameters, the complete matrix of sizes contains 1,053 different combinations. This many sizes of molds is not only overly expensive and difficult to make but difficult and costly to inventory and handle in production.

The present invention provides for the casting of a multiplicity of lens sizes from a single pair of casting mold halves which, as one example, can accomplish a two-thirds reduction of the aforesaid 1,053 sizes by using three base curve radii rather than nine.

Casting the multiplicity of variously sized and otherwise dimensioned contact lenses with a single mold, e.g. mold 10 (FIG. 1) is accomplished as follows:

A predetermined amount of a suitable diluent, i.e. swelling or stuffing agent, is added to the lens casting resin mixture prior to casting lenses with it.

Casting is accomplished by placing the casting precursor in a cavity 12 provided between mold halves 14 and 16. Convex and concave optically finished surfaces 18 and 20 respectively form the cavity 12 in which lens L is produced by curing, e.g. crosslinking or vulcanizing, the casting precursor therewithin. Surface 18 forms the base curve or posterior surface of the cast lens and surface 20 forms the forward or outer lens surface.

After curing and removal of the resulting lens from the mold, the diluent is extracted by immersion in a suitable preferably highly volatile solvent which, in turn, is removed e.g. by evaporation, to cause the lens to shrink by a calculable amount. The amount of shrinkage may be determined by control of the amount of diluent added to the casting mixture. It should be understood, however, that the volatility of the diluent itself and ease of evaporation or volatility of the extracting solvent are factors requiring consideration in calculating the measure of diluent required for ultimately effecting a given reduction (shrinkage) in lens size from its initially cast configuration. For example, the diluent should be completely miscible with the casting resin and not react with any of the resin components and have a low volatility so that the casting mixture (precursor) will remain at fixed composition during preparation and casting. The extraction solvent, on the other hand, should not only be an effective solvent for the diluent and not permanently harm or react with the lens polymer but also have a relatively high volatility for easy evaporation from the extracted lens.

While materials for the casting mixture may include many, if not all, of the various well known optical quality casting resins, a preferred and highly desirable material is silicone rubber, i.e. a clear colorless dimethyl silicone resin or a copolymer silicone resin containing both phenyl and methyl components as in U.S. Pat. Nos. 3,996,187 and 3,996,189 typical of having very little shrinkage associated with their crosslinking or vulcanization reactions.

Possible diluents, i.e. "swelling" or "stuffing" agents, include liquid aliphatic and aromatic hydrocarbons, chlorinated hydrocarbons and silicone oils. Silicone oils are preferred.

To insure maximum solution compatibility, the silicone oil diluent should have the same or nearly the same phenyl siloxane to methyl siloxane ratio as does the silicone casting resin. For example, a commercially available silicone resin known to the trade as GE (General Electric) RTV 655 which contains some diphenyl siloxane can be readily stuffed, i.e. expanded, by dilution with either of the commercially available compositions identified in the trade as GE SF 1153 and DC (Dow Corning) 510. Other useful silicone resins are GE RTV 615 and DC Sylgard 182 with which compatible silicone oils are DC 200 or GE SF 96, SF 97 or SF 98. Any viscosity which may be handled and which is available may be used. However, it is preferable to use a diluent having a viscosity of at least 10 centistokes (CS), anything lower being too volatile. On the other hand, anything over 1,000 CS can be difficult to mix. A preferred viscosity range is 50 to 350 CS.

The extraction solvent should be an effective solvent for the selected diluent and be volatile enough to be easily evaporated from the extracted articles. Suitable solvents include pentane, hexane, heptane, octane, benzene, toluene, xylene, carbon tetrachloride, trichloro ethylene, perchloro ethylene, trichloro trifluoroethane, methylene chloride, chloroform, and hexamethyl disiloxane. A preferred solvent is hexane.

The RTV 655 silicone resin contains typically 6% by weight extractable material. Oil additions of from 4% to 50% by weight, based upon the starting resin, may be used. Best results, however, can be obtained by oil additions of from 0% to 22%. Beyond 22% the castings become unusually soft and flexible which may render finishing difficult, should such finishing be required or desired. Optical properties, however, remain satisfactory and these castings can be used.

The amount of shrinkage of a silicone lens cast according to the present invention can be determined from the following relationship:

$$\left[ \frac{\text{Volume of article after extraction}}{\text{Volume of article before extraction}} \right] = \left[ \frac{\text{Linear dimension of article after extraction}}{\text{Linear dimension of article before extraction}} \right]$$

Using General Electric SF 1153 silicone oil and General Electric RTV 655 silicone resin which have nearly identical densities and refractive indices, weight percent may be substituted for volume percent for all practical purposes. When extracted, all linear dimensions will shrink substantially proportionally the same amount, i.e. the lens will retain its originally cast geometrical shape but the base curve radius, overall diameter, thickness and optical focal length will all change by substantially the same fraction.

Examples of reduction to practice of the present invention are:

EXAMPLE I

In a mold with a base curve radius (curve 18, FIG. 1) of 8.91 mm GE (General Electric) RTV 655 mixture was placed and cured, i.e. vulcanized with applied heat of approximately 90° C. Five lenses thus made were extracted with hexane and dried. Their average weight loss was 6.6% and their average base curve radius was 8.69 mm.

EXAMPLE II

In a mold with a base curve radius of 8.91 mm there was placed a mixture of 10 parts GE RTV 655 by weight and 1 part DC (Dow Corning) 510 oil. With this mixture five lenses were cast. Their average weight loss was 17.5% and their average base curve was 8.35 mm.

EXAMPLE III

In a mold with base curve radius of 8.91 mm, 1.5 parts by weight of DC 510 oil was added to 10 parts GE RTV 655 resin. With this mixture five lenses were cast. Their average weight loss was 21.1% and their average base curve was 8.2 mm.

EXAMPLE IV

In a mold with base curve radius of 8.91 mm, 5 parts by weight of DC 510 oil was added to 10 parts GE RTV 655 resin. With this mixture five lenses were cast. Their average weight loss was 37.8% and the average base curve was approximately 7.5 mm.

It should be noted that extraction affects the refractive power of a lens along with its other dimensions. The focal length with shrink an amount directly proportional to the change in other linear dimensions such as diameter, base curve radius and thickness. For those powers near zero diopters (plano) the change in power will usually remain within the manufacturer's or fitter's tolerance. In those situations, especially for higher powers, either + or −, the power change can be predetermined and an appropriate mold be chosen to yield the desired finished power within tolerance. Since the typical manufacturer's tolerance is one half of the power increment between lenses, all lenses made will fall within one or another power increment. Those skilled in the art will remember that the power of a lens in diopters is defined as equal to the reciprocal of the focal length in meters.

From the foregoing, it can be seen that efficient and predictable shrinkage of cast contact lenses can be accomplished to control finished lens size relative to casting cavity size by a measure of the diluent included in the casting precursor. This control of lens size greatly reduces the problems and drawbacks of heretofore requirements for a different casting mold for each different patient prescription. According to this invention, variations in amounts of diluent used in the casting mixture produce corresponding variations in sizes of cast and extracted lenses.

Those skilled in the art will readily appreciate that there are various other forms and adaptations of the invention which may be made to suit particular requirements. The foregoing illustrations are not to be interpreted as restrictive of the invention beyond that necessitated by the following claims.

I claim:

1. The method of making a contact lens of an ophthalmic quality resin comprising:
    preparing a casting precursor by adding to the resin an extractable, non-reactive, miscible diluent in an amount precontrolled according to a subsequent volume reduction desired of the precursor after casting;
    filling a mold casting cavity of predetermined fixed shape and size with said precursor;
    at least partially curing the thus cast precursor in situ;
    removing the resulting cast lens from said cavity; and
    extracting said diluent from the cast lens to shrink the lens to a size smaller than that of said casting cavity, said size reduction corresponding to said amount of said diluent added to said precursor.

2. The method according to claim 1 wherein said resin is a silicone resin and said diluent is selected from the group consisting of a liquid aliphatic hydrocarbon, aromatic hydrocarbon, chlorinated hydrocarbon, and silicone oil.

3. The method according to claim 2 wherein said diluent is a silicone oil.

4. The method according to claim 1 wherein said step of extracting said diluent is accomplished with an effective solvent for said diluent, said extraction solvent being harmless and non-reactive to said lens resin and of sufficiently high volatility to be readily removed by evaporation from said cast lens.

5. The method according to claim 4 wherein said extraction solvent is selected from the group consisting of pentane, hexane, heptane, octane, benzene, toluene, xylene, carbon tetrachloride, trichloro ethylene, perchloro ethylene, trichloro trifluoroethane, methylene chloride, chloroform and hexamethyl disiloxane.

6. The method according to claim 3 wherein said diluent is extracted with a solvent selected from the group consisting of pentane, hexane, heptane, octane, benzene, toluene, xylene, carbon tetrachloride, trichloro ethylene, perchloro ethylene, trichloro trifluoroethane, methylene chloride, chloroform and hexamethyl disiloxane.

7. The method according to claim 6 wherein said extraction solvent is hexane.

8. The method according to claim 3 wherein said diluent has a phenyl-methyl ratio within 4 mole % of the phenyl-methyl ratio of said silicone casting resin.

9. The method according to claim 3 wherein said silicone oil diluent has a viscosity between 10 centistokes and 10,000 centistokes.

10. The method according to claim 1 wherein said precontrolled amount of extractable diluent is within a range of from nearly 0 volume % to 25 volume %.

11. The method according to claim 1 wherein said precontrolled amount of diluent is a liquid hydrocarbon having a normal boiling point above 100° C.

12. The method according to claim 11 wherein said liquid hydrocarbon is within a range of from nearly 0 volume % to 25 volume %.

* * * * *